United States Patent
Chao et al.

(10) Patent No.: US 9,221,547 B2
(45) Date of Patent: Dec. 29, 2015

(54) STATIC DISSIPATIVE FUEL TANK COATINGS AND METHODS

(75) Inventors: Alexander Chao, Renton, WA (US);
Eric Richard Steele, Kent, WA (US);
Kevin Darrell Pate, Kirkland, WA (US);
Megan J. Hurt, Everett, WA (US);
Michael G. Anderson, Renton, WA (US); Theresa Nadine Ward, Redmond, WA (US); Judson Sid Clements, Boone, NC (US)

(73) Assignee: The Boeing Company, Chicago, IL (US)

(*) Notice: Subject to any disclaimer, the term of this patent is extended or adjusted under 35 U.S.C. 154(b) by 810 days.

(21) Appl. No.: 12/824,138

(22) Filed: Jun. 25, 2010

(65) Prior Publication Data

US 2011/0315818 A1     Dec. 29, 2011

(51) Int. Cl.
*H05F 3/00* (2006.01)
*B64D 37/32* (2006.01)
*B64D 45/02* (2006.01)

(52) U.S. Cl.
CPC ............ *B64D 37/32* (2013.01); *B64D 45/02* (2013.01); *Y02T 50/44* (2013.01)

(58) Field of Classification Search
CPC ..... B64D 45/02; B65D 90/46; B65D 2213/02
USPC .......................................................... 361/218
See application file for complete search history.

(56) References Cited

U.S. PATENT DOCUMENTS

| | | | |
|---|---|---|---|
| 3,906,308 A | 9/1975 | Amason et al. | |
| 4,583,702 A | 4/1986 | Baldwin | |
| 4,623,951 A * | 11/1986 | DuPont et al. | 361/218 |
| 5,028,355 A | 7/1991 | Cope et al. | |
| 5,951,747 A * | 9/1999 | Lewis et al. | 106/14.44 |
| 6,059,867 A * | 5/2000 | Lewis et al. | 106/14.44 |
| 7,277,266 B1 | 10/2007 | Le et al. | |
| 7,802,753 B2 * | 9/2010 | Tichborne et al. | 244/1 A |
| 2003/0064241 A1* | 4/2003 | Suzuki et al. | 428/626 |
| 2005/0191493 A1 | 9/2005 | Glatkowski | |
| 2006/0051592 A1 | 3/2006 | Rawlings et al. | |

(Continued)

FOREIGN PATENT DOCUMENTS

| | | |
|---|---|---|
| WO | 2004012937 A1 | 2/2004 |
| WO | 2009126592 A2 | 10/2009 |
| WO | WO2009126591 A2 * | 10/2009 |

OTHER PUBLICATIONS

International Search Report and Written Opinion of the International Searching Authority for counterpart PCT/US2011/035650, Jan. 30, 2012, 14 pages.

Japanese Patent Office (JPO) Office Action (Japanese version and English translation), issued Sep. 29, 2015, for counterpart Japanese patent application No. JP 2013-516573, Applicant The Boeing Company, 4 pages.

*Primary Examiner* — Stephen W Jackson
*Assistant Examiner* — Ann Hoang

(57) ABSTRACT

There is provided a method for mitigating static discharge in a fuel container. The method provides a static dissipative coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less. The method further provides applying the static dissipative coating to a surface of the fuel container to form a coated surface.

20 Claims, 4 Drawing Sheets

(56) References Cited

U.S. PATENT DOCUMENTS

| | | |
|---|---|---|
| 2006/0146473 A1 | 7/2006 | Heidlebaugh et al. |
| 2008/0308678 A1 | 12/2008 | Purdy et al. |
| 2010/0007099 A1* | 1/2010 | Guillemette et al. ......... 277/650 |
| 2011/0114189 A1* | 5/2011 | Crain et al. ....................... 137/1 |

* cited by examiner

STATIC DISSIPATIVE FUEL TANK COATINGS AND METHODS

BACKGROUND

1) Field of the Disclosure

The disclosure relates generally to coatings and methods for applying coatings, and in particular, to static dissipative coatings and methods for applying static dissipative coatings to fuel tank components.

2) Description of Related Art

The application of electrostatic (static) dissipative coatings onto conductive materials is known in a variety of industries, including the aerospace industry. Such static dissipative coatings may be applied to dissipate electrostatic charge that builds up on the surface of such conductive materials when the static dissipative coatings are provided with a point of discharge, such as an electrical path to ground. Insulating coatings may not adequately discharge the electrostatic charge, and the combination of insulating coatings on electrically-grounded conductive materials, or substrates, may create capacitance as electrostatic charges accumulate on the coating surfaces. Capacitance may result in spontaneous, self-initiated, electrical surface discharges when the electrostatic charges cannot relax to ground. These spontaneous, self-initiated, electrical surface discharges are also commonly known as propagating brush discharges (PBD). Propagating brush discharges are generally undesirable.

Known static dissipative coatings exist for use on glass-fiber reinforced plastic components on aircraft. However, such known static dissipative coatings can contain carbon black which can induce galvanic corrosion of aluminum.

In addition, a known method exists for applying an insulating primer on composite fuel tank surfaces of aircraft. However, to prevent propagating brush discharges (PBD), such known method requires extensive masking of the surface or substrate prior to applying the insulating primer, and further requires a striped primer configuration with specific stripe widths when applying the insulating primer. Thus, this known method can require additional labor and time to complete which can result in increased labor and manufacturing costs. Moreover, this known method may not allow the usage of glass-fiber reinforced plastic in the fuel tank which can result in extensive composite drill break-out, such as break-out caused by drilling of epoxy preimpregnated carbon fiber tape.

Accordingly, there is a need in the art for static dissipative fuel tank coatings and methods that provides advantages over known coatings and methods.

SUMMARY

This need for static dissipative fuel tank coatings and methods is satisfied. As discussed in the below detailed description, embodiments of the static dissipative fuel tank coatings and methods of applying the static dissipative fuel tank coatings may provide significant advantages over existing coatings and methods.

In an embodiment of the disclosure, there is provided a method for mitigating static discharge in a fuel container. The method comprises providing a static dissipative coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less. The method further comprises applying the static dissipative coating to a surface of the fuel container to form a continuous coated surface. The method may further comprise prior to applying the static dissipative coating to the surface of the fuel container, treating the surface of the fuel container in order to clean the surface and increase adhesion of the static dissipative coating to the surface. The method may further comprise after applying the static dissipative coating to the surface of the fuel container, curing the coated surface.

In another embodiment of the disclosure, there is provided a method for mitigating static discharge in an aircraft fuel tank. The method comprises providing a static dissipative coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less. The method further comprises providing an aircraft fuel tank comprising one or more conductive and dielectric composite components, and further comprising one or more metal components. The method may further comprise treating a surface of the composite component of the aircraft fuel tank in order to clean the surface and increase adhesion of the static dissipative coating to the surface. The method further comprises applying the static dissipative coating to the surface of the composite component of the aircraft fuel tank to form a continuous coated surface. The method further comprises curing the coated surface.

In another embodiment of the disclosure, there is provided a static dissipative coating for mitigating static discharge in a fuel container. The coating has a volume resistivity of $1.0 \times 10^9$ Ω-m (ohm-meter) or less when measured at 40 V (volts) or less, has a surface resistivity of $1.0 \times 10^{11}$ Ω/sq (ohm per square) or less when measured at 100 V (volts) or less, has a breakdown voltage of 4000 V (volts) or less, and has a charge decay of 60 seconds or less.

In another embodiment of the disclosure, there is provided an aircraft comprising a fuselage, a wing operatively coupled to the fuselage, and a fuel tank disposed inside at least one of the fuselage and the wing. The fuel tank comprises one or more conductive and dielectric composite components, and further comprises one or more metal components comprising aluminum components, titanium components, and corrosion-resistant steel components. A static dissipative coating is preferably applied on a surface of the one or more composite components of the fuel tank. The static dissipative coating has a volume resistivity of $1.0 \times 10^9$ Ω-m (ohm-meter) or less when measured at 40 V (volts) or less, has a surface resistivity of $1.0 \times 10^{11}$ Ω/sq (ohm per square) or less when measured at 100 V (volts) or less, has a breakdown voltage of 4000 V (volts) or less, and has a charge decay of 60 seconds or less.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
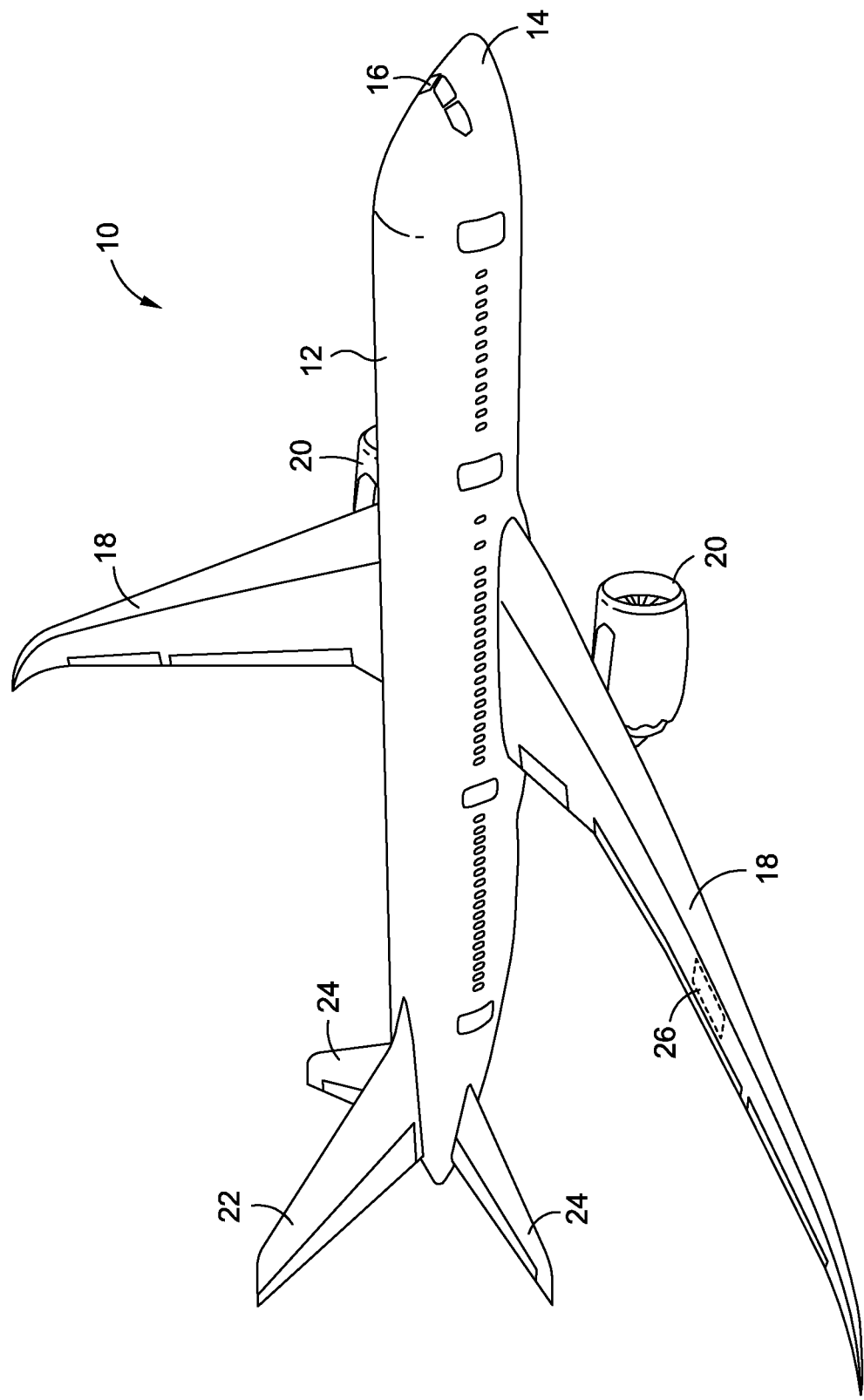
FIG. 1 is an illustration of a perspective view of an exemplary aircraft having at least one fuel container coated with an embodiment of a static dissipative coating of the disclosure.

Now referring to the Figures, FIG. 1 is an illustration of a perspective view of an exemplary aircraft 10 having at least one fuel container 26, preferably in the form of a fuel tank 30 (see FIG. 2), coated with an embodiment of a static dissipative coating 36 (see FIG. 2) of the disclosure. The aircraft 10 comprises a fuselage 12, a nose 14, a cockpit 16, wings 18 operatively coupled to the fuselage 12, one or more propulsion units 20, a tail vertical stabilizer 22, one or more tail horizontal stabilizers 24, and at least one fuel container 26. Although the aircraft 10 shown in FIG. 1 is generally representative of a commercial passenger aircraft, the coatings and methods disclosed herein may also be employed in the assembly of virtually any other types of aircraft. More specifically, the teachings of the disclosed embodiments may be applied to the manufacture and assembly of other passenger aircraft, cargo aircraft, rotary aircraft, and any other types of aircraft. It may also be appreciated that alternate embodiments of coatings and methods in accordance with the disclosure may be utilized in other aerial vehicles.

Figure 2:
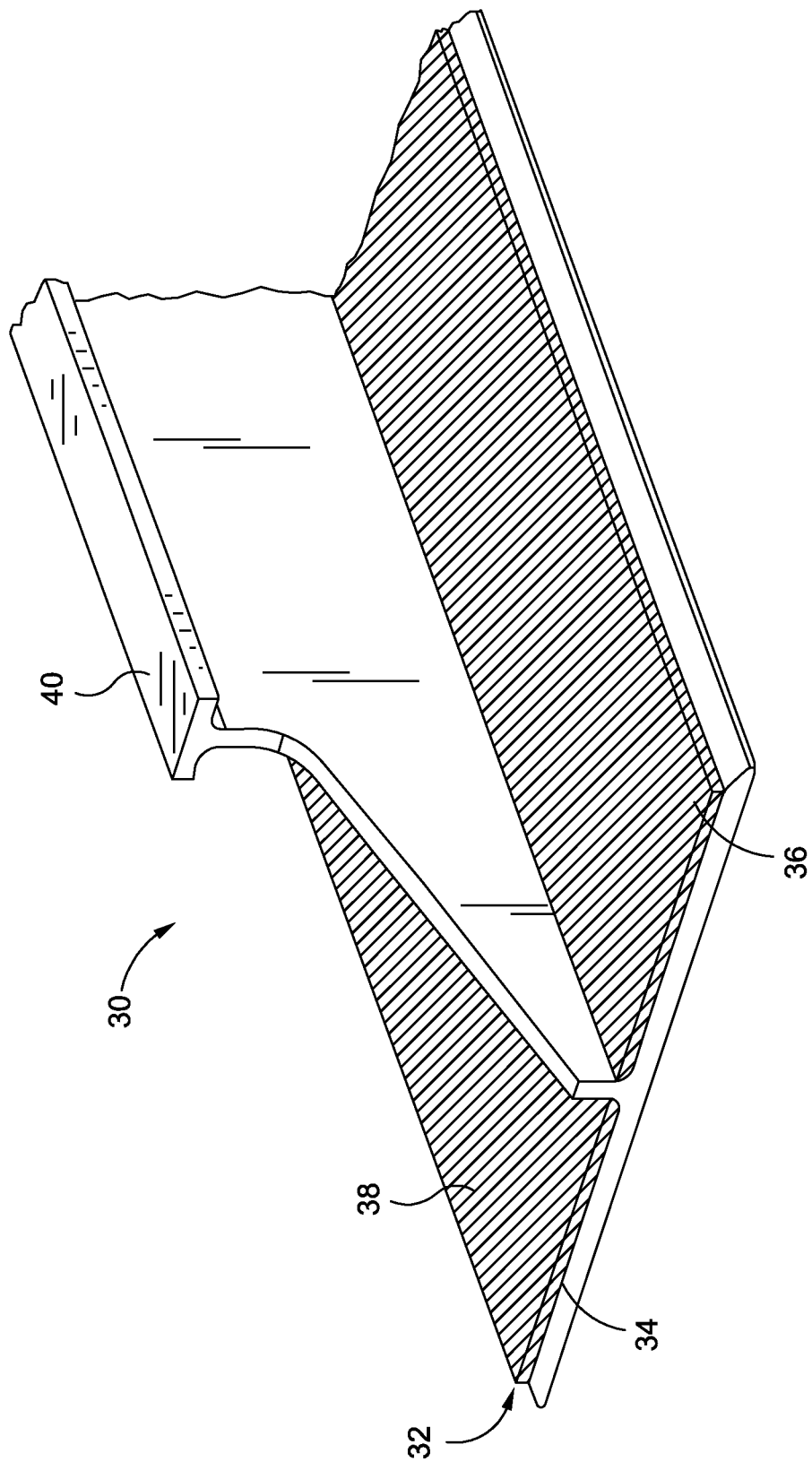
FIG. 2 is an illustration of a perspective view of a portion of a fuel container coated with an embodiment of a static dissipative coating of the disclosure.

In an embodiment of the disclosure, there is provided a static dissipative coating 36 (see FIG. 2) for mitigating static discharge in a fuel container 26, preferably in the form of an aircraft fuel tank 30 (see FIG. 2). The static dissipative coating 36 has a volume resistivity of $1.0 \times 10^9$ $\Omega$-m (ohm-meter) or less when measured at 40 V (volts) or less. Volume resistivity measurements should preferably not be measured at voltages higher than 40 V (volts). The static dissipative coating 36 further has a surface resistivity of $1.0 \times 10^{11}$ $\Omega$/sq (ohm per square) or less when measured at 100 V (volts) or less. Surface resistivity measurements should preferably not be measured at voltages higher than 100 V (volts). When volume resistivity and surface resistivity measurements are taken, unacceptably high voltages can break down the coating before reliable volume resistivity and surface resistivity measurements can be obtained. The static dissipative coating 36 further has a breakdown voltage of 4000 V (volts) or less. The static dissipative coating 36 further has a charge decay of sixty (60) seconds or less. In one embodiment, the static dissipative epoxy coating 36 may have a content of cadmium, chromium, and lead of 420 g/L (grams per liter) or less. In one embodiment, the static dissipative coating 36 may have a volatile organic compound (VOC) content of 670 g/L or less, and preferably, a VOC content of 420 g/L or less. Preferably, the static dissipative coating 36 has a resistivity of $1.0 \times 10^8$ $\Omega$-m (ohm-meter) or less when measured at 40 V (volts) or less. Preferably, the static dissipative coating 36 is grounded to provide a bleed path for a static charge. Grounding provides a safe point of discharge of unwanted static electricity and represents zero electrical potential. Preferably, the static dissipative coating 36 enables dissipation of a build-up of the static charge during refueling of the aircraft 10 to prevent creation of a propagating brush discharge (PBD). Preferably, the static dissipative coating 36 does not impact design for lightning direct effects protection. Preferably, the static dissipative coating 36 is chemical resistant to water, hydraulic fluid, and jet fuel. Examples of hydraulic fluids may comprise mineral oils, alkyl and aryl phosphate ester based oils, petroleum based fluids, and other suitable hydraulic fluids. Preferred hydraulic fluids comprise SKYDROL LD-4, a fire resistant phosphate ester hydraulic fluid obtained from Solutia Inc. of St. Louis, Mo. (SKYDROL is a registered trademark of Solutia Inc. of St. Louis, Mo.), and HYJET V, a fire resistant phosphate ester hydraulic fluid obtained from Exxon Mobil Corporation of Irving, Tex. (HYJET is a registered trademark of Exxon Mobil Corporation of Irving, Tex.). Examples of jet fuels may comprise liquid hydrocarbons with or without metal ions, and other suitable jet fuels. Preferably, the static dissipative coating is chemically compatible with one or more sealants such as polysulfide sealants, low density synthetic rubber sealants, epoxy sealants, polyurethane sealants, or another suitable sealant. Preferably, the static dissipative coating enables adhesion of the one or more sealants to one or more components of the fuel container, for example, the sealant may be used for fay surface sealing between shear ties and the fuel tank skin. Preferably, the static dissipative coating provides a barrier between any ultraviolet radiation damage that may occur during manufacturing operations, for example, unitraviolet radiation emitted from illumination during the manufacturing operation, and the surface of the fuel container that is coated. Preferably, the static dissipative coating 36 is a non-chromated integral fuel tank coating that is static dissipative for use on conductive and dielectric or non-conductive composite surfaces or substrates, and titanium and non-plated corrosion resistant steel (CRES) surfaces or substrates.

FIG. 2 is an illustration of a perspective view of a portion of an exemplary aircraft fuel tank 30 having one or more composite components 32 and one or more metal components 40, where the composite component 32 is coated with an embodiment of the static dissipative coating 36 of the disclosure. As shown in FIG. 2, the static dissipative epoxy coating 36 is not applied over the metal component 40 of the fuel tank 30. However, in alternate embodiments, the static dissipative coating 36 may be applied to non-aluminum conductive surfaces or substrates, such as titanium and non-plated corrosion resistant steel (CRES). Preferably, the fuel container 26, in the form of fuel tank 30, comprises one or more composite components 32, and more preferably, comprises one or more conductive and dielectric composite components. Examples of conductive composite components may comprise carbon-fiber reinforced plastic (CFRP) or another suitable conductive composite material. Examples of dielectric or non-conductive composite components may comprise glass-fiber reinforced plastic (GFRP), surfacing films, fiber-reinforced polymers such as fiber-reinforced polyamides, aramid-reinforced materials, fiberglass, resins such as polyester resin, vinylester resin, and epoxy resin, or another suitable dielectric composite material. Preferably, the fuel container 26, in the form of fuel tank 30, further comprises one or more metal components 40 (see FIG. 2) comprising aluminum components, titanium components, corrosion-resistant steel components, or another suitable metal component. The static dissipative coating 36 does not induce galvanic corrosion on the aluminum components, if they are present, in the fuel tank 30. The chemical composition of the static dissipative coating 36 does not contain any elements which would induce galvanic corrosion on aluminum components in an aluminum/carbon-fiber reinforced plastic hybrid fuel tank. The static dissipative coating may reduce the possibility of electrostatic build-up by enabling static charges to escape to ground. Accordingly, electrostatic build-up and undesirable electrical surface discharges may be reduced or eliminated.

Figure 3:
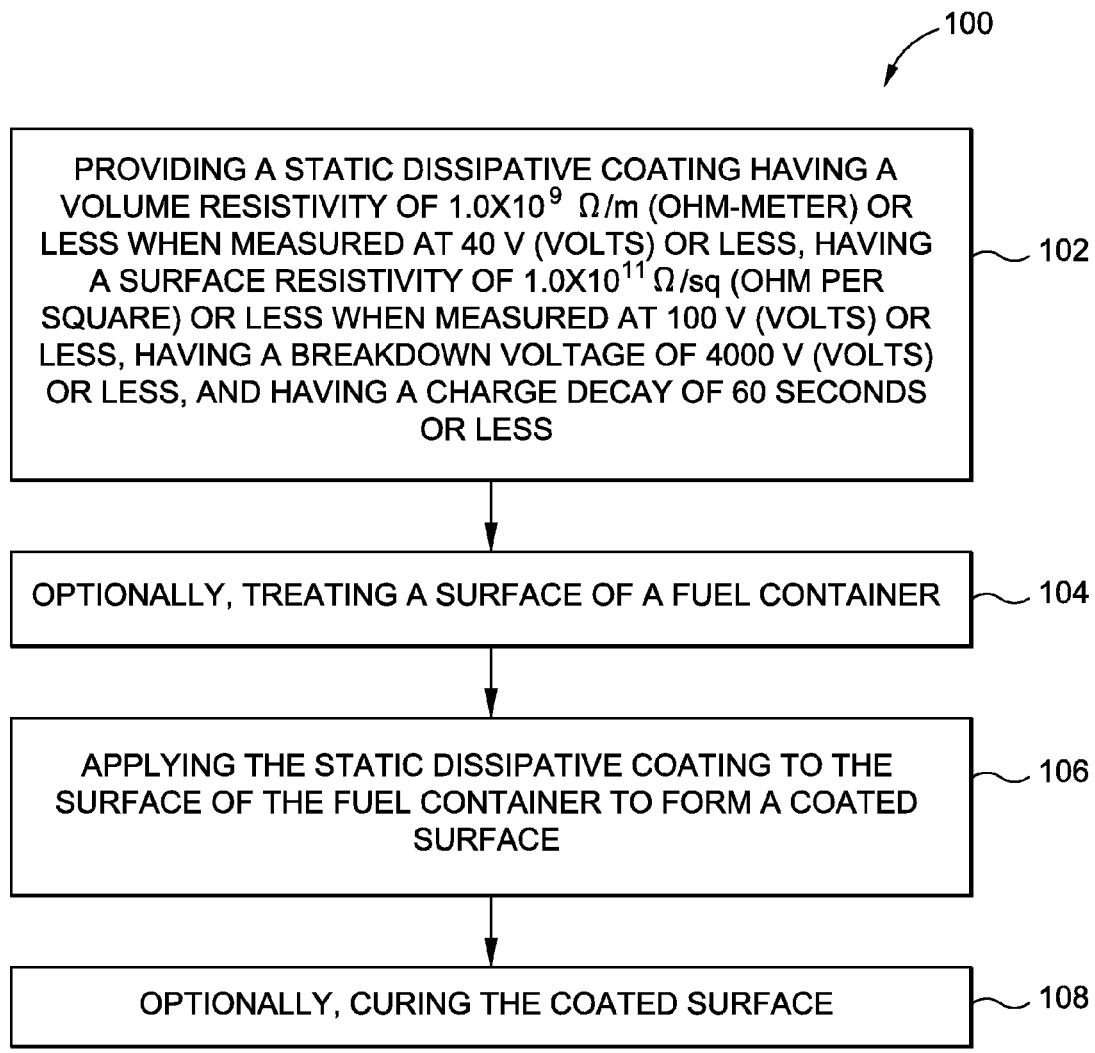
FIG. 3 is a flow diagram illustrating an exemplary method for defining the application of an embodiment of a static dissipative coating of the disclosure to a surface of a fuel container; and, FIG. 4 is a flow diagram illustrating another exemplary method for defining the application of an embodiment of a static dissipative coating of the disclosure to a surface of an aircraft fuel tank.

FIG. 3 is a flow diagram illustrating an exemplary method 100 for defining the application of an embodiment of a static dissipative coating 36 of the disclosure to a surface 34 of a fuel container 26 (see FIG. 1). In an embodiment of the disclosure, there is provided the method 100 for mitigating static discharge in the fuel container 26 (see FIG. 1). The fuel container 26 preferably comprises an aircraft fuel tank 30 (see FIG. 2). The method 100 comprises step 102 of providing a static dissipative coating 36 (see FIG. 2) having a volume resistivity of $1.0 \times 10^9$ Ω-m (ohm-meter) or less when measured at 40 V (volts) or less. The static dissipative coating 36 further has a surface resistivity of $1.0 \times 10^{11}$ Ω/sq (ohm per square) or less when measured at 100 V (volts) or less. The static dissipative coating 36 further has a breakdown voltage of 4000 V (volts) or less. The static dissipative coating 36 further has a charge decay of sixty (60) seconds or less. Preferably, the static dissipative coating 36 preferably has a resistivity of $1.0 \times 10^8$ Ω-m (ohm-meter) or less when measured at 40 V (volts) or less. Preferably, the static dissipative coating 36 is grounded to provide a bleed path for a static charge, and preferably, the static dissipative coating enables dissipation of a build-up of the static charge during refueling to prevent creation of propagating brush discharge (PBD). Preferably, the static dissipative coating is chemical resistant to water, hydraulic fluid, and jet fuel. Preferably, the static dissipative coating is chemically compatible with one or more sealants, enables adhesion of the one or more sealants to one or more components in the fuel container, and provides a barrier between any ultraviolet radiation and the surface of the fuel container.

The method 100 may further comprise step 104 of treating the surface 34 of the fuel container 26. Treating the surface preferably comprises cleaning the surface and increasing adhesion of the static dissipative coating 36 to the surface 34. Depending on the type and condition of the surface 34 will determine how the surface 34 is treated or prepared. For example, for composite surfaces, the composite surface may be treated by first using a cleaning solvent, such as methyl ethyl ketone or another suitable solvent to wipe the composite surface, then sanding a bag side of the composite surface with 150 or 180 grit aluminum oxide abrasive paper or another suitable sanding element, then abrading the composite surface with a pneumatic sander, then removing the sanding residue with oil free compressed air, and then wiping again with the cleaning solvent. Preferably, the composite surface should be free of contaminants so as to increase the adhesion of the static dissipative coating 36 to the composite surface. For metal surfaces, the metal surface may be treated by, for example, sandblasting, degreasing, chemically cleaning, and/or machining the metal surface. An exemplary embodiment of treating the surface of titanium and corrosion-resistant alloys may comprise first using a cleaning solvent, such as methyl ethyl ketone or another suitable solvent, to wipe the metal surface, and then treating the cleaned surface with an abrasive blast, mechanical abrasion, or chemical etching to achieve a water break-free surface. A sol-gel conversion coating may then be applied to the treated surface of the titanium and corrosion resistant alloys. The method 100 further comprises step 106 of applying the static dissipative coating 36 to the surface 34 of the fuel container 26, preferably in the form of fuel tank 30, to form a coated surface 38 (see FIG. 2). The static dissipative coating 36 that forms the coated surface 38 preferably has a thickness in a range of from about 0.3 mils to about 2.0 mils. The static dissipative coating 36 may be applied to the surface 34 of the fuel container 26 by known processes. Such known processes may comprise a spray system process such as an HVLP (high volume, low pressure) system, a brush application process, a roller application process, or another suitable process. Preferably, the fuel container 26, in the form of fuel tank 30, comprises one or more composite components 32 as discussed above, and more preferably, one or more conductive and/or dielectric or non-conductive composite components. Preferably, the conductive composite component comprises carbon-fiber reinforced plastic (CFRP) or another suitable conductive composite material. Preferably, the dielectric or non-conductive composite component comprises glass-fiber reinforced plastic (GFRP), surfacing films, fiber-reinforced polymers such as fiber-reinforced polyamides, aramid-reinforced materials, fiberglass, resins such as polyester resin, vinylester resin, and epoxy resin, or another suitable dielectric composite material. The fuel container 26, preferably in the form of a fuel tank 30 (see FIG. 2), may further comprise one or more metal components 40 (see FIG. 2) comprising aluminum components, titanium components, corrosion-resistant steel (CRES) components, or other suitable metal components. The static dissipative coating 36 does not induce galvanic corrosion on aluminum components, if they are present, in the fuel container 26, in the form of fuel tank 30. The method 100 may further comprise step 108 of curing the coated surface 38. The coated surface 38 is preferably cured for an effective time period in a range of from about 30 minutes to about 7 days and at an effective temperature in a range of from about 55° F. (degrees Fahrenheit) to about 210° F. (degrees Fahrenheit).

Figure 4:
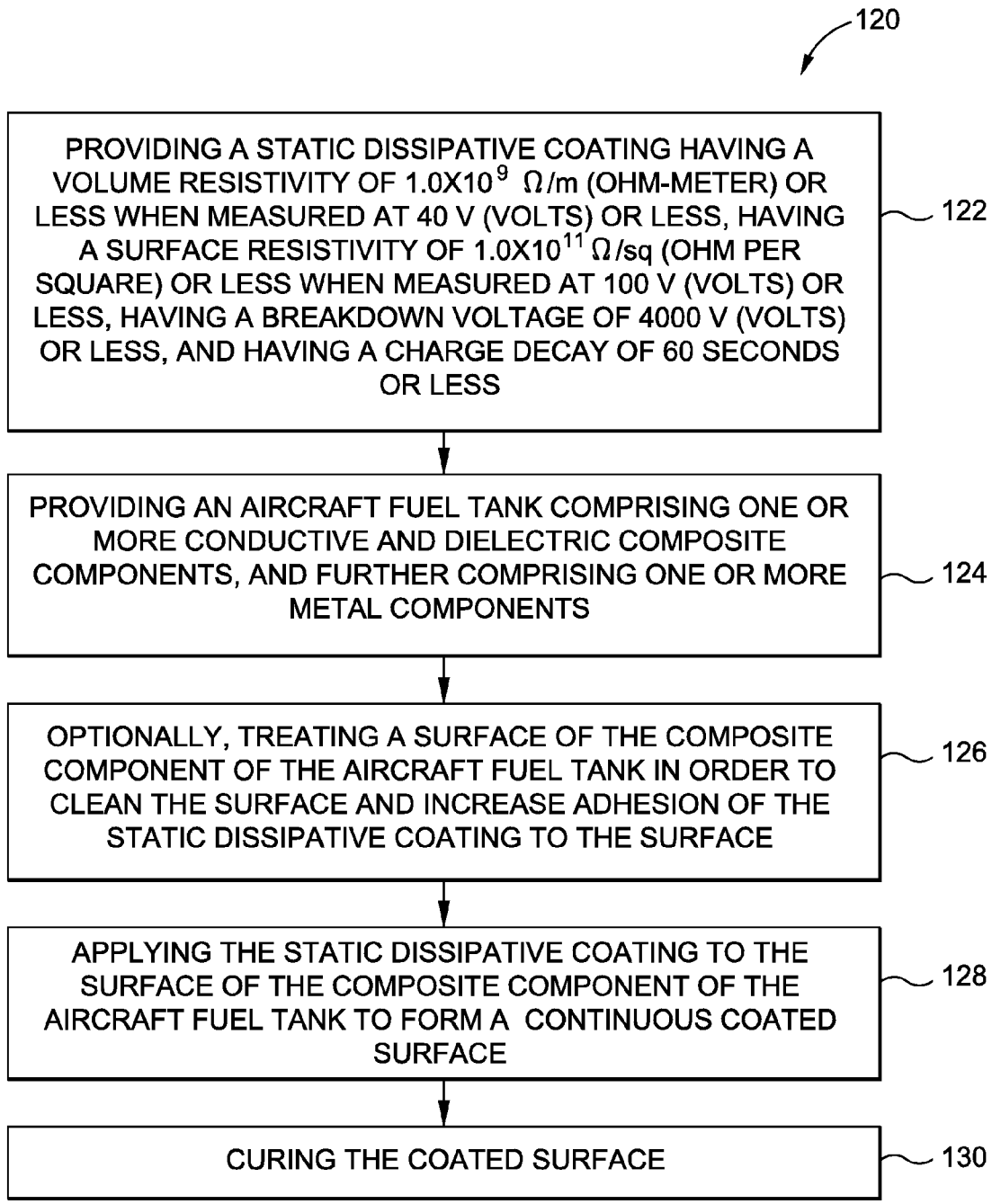

FIG. 4 is a flow diagram illustrating another exemplary method 120 for defining the application of an embodiment of a static dissipative coating 36 of the disclosure to a surface of a composite component of a fuel tank 30 of an aircraft. In another embodiment of the disclosure, there is provided the method 120 for mitigating static discharge in an aircraft fuel tank. The method 120 comprises step 122 of providing a static dissipative coating 36 having a volume resistivity of $1.0 \times 10^9$ Ω-m (ohm-meter) or less when measured at 40 V (volts) or less. The static dissipative coating 36 further has a surface resistivity of $1.0 \times 10^{11}$ Ω/sq (ohm per square) or less when measured at 100 V (volts) or less. The static dissipative coating 36 further has a breakdown voltage of 4000 V (volts) or less. The static dissipative coating 36 further has a charge decay of sixty (60) seconds or less. The method 120 further comprises step 124 of providing a fuel tank 30 of an aircraft where the fuel tank 30 comprises one or more composite components 32 that are conductive and/or dielectric or non-conductive. Preferably, the conductive composite component comprises carbon-fiber reinforced plastic (CFRP) or another suitable conductive composite material. Preferably, the dielectric or non-conductive composite component comprises glass-fiber reinforced plastic (GFRP), surfacing films, fiber-reinforced polymers such as fiber-reinforced polyamides, aramid-reinforced materials, fiberglass, resins such as polyester resin, vinylester resin, and epoxy resin, or another suitable dielectric composite material. Preferably, the fuel tank 30 further comprises one or more metal components 40 comprising aluminum components, titanium components, corrosion-resistant steel components or another suitable metal component.

The method 120 may further comprise step 126 of treating the surface 34 of the composite component 32 of the fuel tank 30 of the aircraft in order to clean the surface and increase adhesion of the static dissipative coating 36 to the surface 34. Depending on the type and condition of the surface 34 will determine how the surface 34 is treated or prepared. For example, for composite surfaces, the composite surface may be treated by first using a cleaning solvent, such as methyl ethyl ketone or another suitable solvent to wipe the composite surface, then sanding a bag side of the composite surface with 150 or 180 grit aluminum oxide abrasive paper or another suitable sanding element, then abrading the composite surface with a pneumatic sander, then removing the sanding residue with oil free compressed air, and then wiping again with the cleaning solvent. Preferably, the composite surface should be free of contaminants so as to increase the adhesion of the static dissipative coating 36 to the composite surface. For metal surfaces, the metal surface may be treated by, for example, sandblasting, degreasing, chemically cleaning, and/or machining the metal surface. An exemplary embodiment of treating the surface of titanium and corrosion-resistant alloys may comprise first using a cleaning solvent, such as methyl ethyl ketone or another suitable solvent, to wipe the metal surface, and then treating the cleaned surface with an abrasive blast, mechanical abrasion, or chemical etching to achieve a water break-free surface. A sol-gel conversion coating may then be applied to the treated surface of the titanium and corrosion resistant alloys. The method 120 further comprises step 128 of applying the static dissipative coating 36 to the surface 34 of the composite component 32 of the fuel tank 30 of the aircraft to form a coated surface 38 that is preferably continuous. The static dissipative coating 36 preferably has a thickness in a range of from about 0.3 mils to about 2.0 mils. The static dissipative coating 36 may be applied to the surface 34 of the composite component 32 of the fuel tank 30 by known processes. Such known processes may comprise a spray system process such as an HVLP (high volume, low pressure) system, a brush application process, a roller application process, or another suitable process. The method 120 further comprises step 130 of curing the coated surface 38 for an effective time period in a range of from about 30 minutes to about 7 days and at an effective temperature in a range of from about 55° F. (degrees Fahrenheit) to about 210° F. (degrees Fahrenheit).

In another embodiment of the disclosure, there is provided an aircraft 10 (see FIG. 1) comprising a fuselage 12, a wing 18 operatively coupled to the fuselage 12, and a fuel container 26, preferably in the form of fuel tank 30, disposed inside at least one of the fuselage 12 and the wing 18. The fuel tank 30 comprises one or more conductive and dielectric composite components. Preferably, the conductive composite components comprise carbon-fiber reinforced plastic (CFRP) or another suitable conductive composite material. Preferably, the dielectric or non-conductive composite components may comprise glass-fiber reinforced plastic (GFRP), surfacing films, fiber-reinforced polymers such as fiber-reinforced polyamides, aramid-reinforced materials, fiberglass, resins such as polyester resin, vinylester resin, and epoxy resin, or another suitable dielectric composite material. The fuel tank 30 further comprises one or more metal components comprising aluminum components, titanium components, corrosion-resistant steel (CRES) components, or another suitable metal component. The static dissipative coating 36 is applied on the surface 34 of the composite component 32 of the fuel tank 30.

As discussed above, the static dissipative coating 36 has a volume resistivity of $1.0\times10^9$ Ω-m (ohm-meter) or less when measured at 40 V (volts) or less, has a surface resistivity of $1.0\times10^{11}$ Ω/sq (ohm per square) or less when measured at 100 V (volts) or less, has a breakdown voltage of 4000 V (volts) or less, and has a charge decay of 60 seconds or less.

Embodiments of the static dissipative coating 36 and methods of applying the static dissipative coating 36 on composite fuel tanks of aircraft may provide significant advantages over existing coatings and methods. The disclosed coating and method of applying the coating can mitigate, prevent, or eliminate electrostatic charge build-up, for example, during refueling of an aircraft, which, in turn, can mitigate, prevent, or eliminate the creation of propagating brush discharge (PBD) on surfaces or substrates in the aircraft fuel tank, such as carbon-fiber reinforced plastic and glass-fiber reinforced plastic surfaces or substrates in the aircraft fuel tank. Accordingly, electrostatic build-up and undesirable electrical surface discharges may be mitigated, prevented, or eliminated.

In addition, the disclosed coating and method of applying the coating significantly reduce the time, labor, and cost of preparing the substrate prior to application of the coating, as the disclosed method has no surface area limitations, and the need for extensive masking and a striped coating configuration of the substrate to prevent propagation brush discharge (PBD) is eliminated. Moreover, the disclosed coating and method of applying the coating reduce recurring labor and flow time required for paint operations of the aircraft wing and certain aircraft fuel tanks, such as the center fuel tank. Further, the disclosed coating and method of applying the coating provide static dissipation while not impacting design for lightning direct effects protection. In addition, the disclosed coating and method enable sealant adhesion and provide an interim barrier between ultraviolet radiation and the composite surface or substrate.

In addition, the disclosed coating and method of applying the coating increases fuel tank sealant adhesion. Thus, the coating and method of applying the coating reduce the risk of fuel leaks. Further, the coating provides a barrier to protect the underlying bare surface or substrate of the composite or metal from ultraviolet radiation damage during manufacturing operations. Moreover, because the disclosed coating is designed to be chemically resistant, the coating provides durability against chemicals, such as water, hydraulic fluid, and jet fuel that may be present in the fuel tank.

The disclosed coating and method of applying the coating do not induce galvanic corrosion on aluminum components, if they are present, in the aircraft fuel tank. In particular, the disclosed coating does not contain carbon black which can induce galvanic corrosion of aluminum. Thus, the chemical composition of the disclosed coating does not contain any elements which would induce galvanic corrosion on aluminum components in an aluminum/carbon-fiber reinforced plastic hybrid fuel tank. Moreover, because the disclosed coating does not contain carbon black or any other dark pigment and therefore is not black in color, the color of the disclosed coating provides color contrast to the black-colored composite component of the aircraft fuel tank which, in turn, allows better visibility during sealing operations as well as during fuel tank cleaning.

Finally, the disclosed coating and method of applying the coating may reduce the weight per aircraft by enabling the usage of glass-fiber reinforced plastic by replacing epoxy preimpregnated carbon fiber tape or fabric and significantly reducing break-out caused by drilling of epoxy preimpregnated carbon fiber tape or fabric. A reduction in aircraft weight can, in turn, reduce fuel burn by the aircraft.

EXAMPLES

Development test data was generated using a lab batch of the exemplary disclosed static dissipative coatings to demonstrate conformance to the disclosed static dissipative electrical requirements, including volume resistivity, surface resistivity, breakdown voltage, and charge decay. In addition, qualification test data was generated using a batch produced on production-scale equipment of the exemplary disclosed static dissipative coating. The measurements of the disclosed static dissipative electrical requirements of the disclosed static dissipative coating were performed and measured according to an international industry standard referred to as American Standard Testing Materials (ASTM).

Surface Treatment of Composite Test Panels.

A bag side surface and a tool side surface of each composite test panel was treated or prepared. A methyl ethyl ketone (MEK) cleaning solvent was dispensed onto a clean absorbent wiper and the bag side surface of the composite test panel was rubbed with the solvent soaked wiper to remove any residual release agent. The cleaned bag side surface was sanded with an Orbital Action Sander from National Detroit, Inc. of Rockford, Ill., using 180 grit aluminum oxide abrasive paper and the gloss was removed. The bag side surface was abraded with a pneumatic sander using SCOTCH-BRITE pads (SCOTCH-BRITE is a registered trademark of 3M Company of St. Paul, Minn.). The sanding residue was removed with oil free compressed air and then the bag side surface was cleaned with the solvent again. The process was repeated with the SCOTCH-BRITE pad abrasion for the tool side surface. The sanding and cleaning operations were completed in an area with an exhaust hood to eliminate the distribution of composite dust contamination.

Surface Treatment of Titanium and CRES Test Panels.

The surface of the titanium test panels and the CRES test panels were solvent cleaned and abraded using SCOTCH-BRITE pads. A sol-gel conversion coating was applied to the treated surfaces of the titanium and CRES test panels.

Performance Requirements.

The performance requirements for exemplary static dissipative fuel tank coatings disclosed herein include the following: (1) Volume Resistivity: Volume resistivity of $1.0 \times 10^9$ Ω-m (ohm-meter) or less when measured at 40 V (volts) or less, and stable after environmental exposures of 42 days in jet reference fluid; (2) Surface Resistivity: Surface Resistivity of $1.0 \times 10^{11}$ Ω/sq (ohm per square) or less when measured at 100 V (volts) or less; (3) Breakdown Voltage: Breakdown Voltage of 4000 V (volts) or less; (4) Charge Decay: Charge Decay of 60 seconds or less; (5) Crosshatch Adhesion and Pencil Hardness: good adhesion and durability after immersions in 75 degrees Fahrenheit and 160 degrees Fahrenheit (Water); 75 degrees Fahrenheit and 160 degrees Fahrenheit (Jet Reference Fluid); 75 degrees Fahrenheit (Hydraulic Fluid); 120 degrees Fahrenheit (Condensing Humidity); High Temperature; Low Temperature; (6) Compatible with sealant; (7) No signs of galvanic corrosion after 7 days of salt spray. The jet reference fluid is used as a standard test fluid to represent hydrocarbon fluids, such as jet fuel.

Application Requirements:

(1) Can be uniformly applied with spray (such as from HVLP), electrostatic, brush, roller, or other equipment; (2) Dry film thickness of approximately 1.0 mil for continuous coat on bag side surface; (3) Accelerated curing capabilities (prefer cure temperature of less than or equal to 160 degrees Fahrenheit); (4) Sufficient Pot Life (typically 3 hours minimum); (5) Ease of repair and touch-up (such as ambient cure capabilities); (6) Light colored (provides color contrast to composite surface); (7) Applicable on substrates with trace contamination; and (8) UV (ultraviolet) protection of the bare surface or substrate.

Substrates:

Substrates may comprise: (1) Tape laminate tool and bag side; (2) Fiberglass tool and bag side; (3) Bare titanium with sol-gel; (4) 304 CRES with sol-gel; and (5) 15-5 PH (precipitation hardened) stainless steel with sol-gel (15-5 PH is a registered trademark of AK Steel Corporation of Middletown, Ohio).

Example 1

The coating components were mixed in accordance with the coating supplier instructions. After mixing, a 30 minute induction time was allowed before the coatings were applied to the test panels. The coating was applied in a uniform crosscoat to the composite bag side surface of the test panels to a maximum dry film thickness of 1.5 mils. Aluminum witness panels were used to measure coating thickness. The coating was observed for continuity and freedom from defects. The coating was applied in a uniform crosscoat to the composite tool side, titanium and CRES surfaces of the test panels to a maximum dry film thickness of 1.2 mils. Aluminum witness panels were used to measure coating thickness. The coating was observed for continuity and freedom from defects. The coated test panels were initially cured for 30 minutes at 75 degrees Fahrenheit, then force cured for 60 minutes at 160 degrees Fahrenheit.

Example 2

The base component of the coating was agitated on a paint shaker for 15 minutes prior to mixing with the curing solution component of the coating. The base component was poured into a clean, solvent-resistant, and water-resistant container using the mix ratio in accordance with the coating supplier instructions. The curing solution component of the coating was poured into the container with the base component using the mix ratio in accordance with the coating supplier instructions and the two components were stirred. The thinner component of the coating was poured into the container with the base and curing solution components using the mix ratio in accordance with the coating supplier instructions and the three components were stirred. After mixing, a 30 minute induction time was allowed before applying the coating. The liquid coating was passed through a medium coarse paint strainer obtained from Gerson Inc. of Middleboro, Mass., before the liquid coating was applied. The coating was spray applied to the surface to a dry film thickness of 0.8 mil to 1.2 mil. Aluminum witness panels were used to measure coating thickness on composites. The coating was observed for continuity and freedom from defects. The coated test panels were initially cured for 30 minutes at 75 degrees Fahrenheit, then force cured for 60 minutes at 160 degrees Fahrenheit.

Example 3

The base component of the coating was agitated on a paint shaker for 15 minutes prior to mixing with the hardener component of the coating. The hardener component was poured into the container with the base component, and the two components were stirred. The container containing the base and hardener components were filled to the bottom of the chime with distilled or deionized water and the three components were stirred. The distilled or deionized water used for mixing had an electrical conductivity that did not exceed 25

S/cm at 25 degrees Celsius when measured in accordance with ASTM D 1125 (Standard Test Methods for Electrical Conductivity and Resistivity of Water from American Society of Testing and Materials). After mixing, no induction time was required before applying the coating. The liquid coating was passed through a medium coarse paint strainer obtained from Gerson Inc. of Middleboro, Mass., before the liquid coating was applied. The coating was spray applied to the surface to a dry film thickness of 0.6 mil to 1.0 mil. For two coat applications, the coating was spray applied to the surface to a dry film thickness of 1.2 mil to 2.0 mil. Aluminum witness panels were used to measure coating thickness on composites. The coating was observed for continuity and freedom from defects. The coated test panels were initially cured for 30 minutes at 75 degrees Fahrenheit, then force cured for 8 hours at 160 degrees Fahrenheit.

Example 4

The base component of the coating was agitated on a paint shaker for 15 minutes prior to mixing with the hardener component of the coating. The base component was poured into a clean, solvent-resistant, and water-resistant container using the mix ratio in accordance with the coating supplier instructions. The hardener component was poured into the container with the base component using the mix ratio in accordance with the coating supplier instructions and the two components were stirred. After mixing, a 30 minute induction time was allowed before applying the coating. The liquid coating was passed through a medium coarse paint strainer obtained from Gerson Inc. of Middleboro, Mass., before the liquid coating was applied. The coating was spray applied to the surface to a dry film thickness of 1.0 mil to 1.5 mil. Aluminum witness panels were used to measure coating thickness on composites. The coating was observed for continuity and freedom from defects. The coated test panels were initially cured for 30 minutes at 75 degrees Fahrenheit, then force cured for 1 hours at 150 degrees Fahrenheit.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for mitigating static discharge in a fuel container, the method comprising:
applying a non-chromated static dissipative coating directly to a surface of the fuel container, the fuel container comprising one or more composite components and one or more metal components, wherein the coating is only applied over the one or more composite components as a topmost layer on the one or more composite components, the static dissipative coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less.

2. The method of claim 1, further comprising prior to applying the static dissipative coating to the surface, treating the surface of the fuel container in order to clean the surface and increase adhesion of the static dissipative coating to the surface.

3. The method of claim 1, further comprising after applying the static dissipative coating to the surface, curing the coated surface of the fuel container for an effective time period in a range of from about 30 minutes to about 7 days and at an effective temperature in a range of from about 55° F. (degrees Fahrenheit) to about 210° F. (degrees Fahrenheit).

4. The method of claim 1, wherein the static dissipative coating has a resistivity of $1.0 \times 10^8$ Ω-m (ohm-meter) or less when measured at 40 V (volts) or less.

5. The method of claim 1, wherein the static dissipative coating is grounded to provide a bleed path for a static charge and enables dissipation of a build-up of the static charge during refueling to prevent creation of propagating brush discharge (PBD).

6. The method of claim 1, wherein the static dissipative coating is chemical resistant to water, hydraulic fluid, and jet fuel.

7. The method of claim 1, wherein the static dissipative coating is chemically compatible with one or more sealants, enables adhesion of the one or more sealants to one or more components in the fuel container, and provides a barrier between any ultraviolet radiation and the surface of the fuel container.

8. The method of claim 1, wherein the static dissipative coating does not impact design for lightning direct effects protection.

9. The method of claim 1, wherein the one or more metal components comprises one or more of aluminum components, titanium components, and corrosion-resistant steel (CRES) components.

10. The method of claim 1, wherein the static dissipative coating does not induce galvanic corrosion.

11. A method for mitigating static discharge in an aircraft fuel tank, the method comprising:
applying a non-chromated static dissipative coating directly to a surface of the aircraft fuel tank, the aircraft fuel tank comprising one or more composite components and one or more metal components, wherein the coating is only applied over the one or more composite components as a topmost layer on the one or more composite components, the static dissipative coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less, wherein the static dissipative coating does not impact design for lightning direct effects protection; and,
curing the coating.

12. The method of claim 11, further comprising prior to applying the static dissipative coating directly to the surface of the aircraft fuel tank, treating the surface of the aircraft fuel tank in order to clean the surface and increase adhesion of the static dissipative coating to the surface.

13. A static dissipative non-chromated coating for mitigating static discharge in a fuel container, the fuel container comprising one or more composite components and one or more metal components, the coating applied directly over only the one or more composite components as a topmost layer, the coating having a volume resistivity of $1.0 \times 10^9$ Ω-m (ohm-meter) or less when measured at 40 V (volts) or less, having a surface resistivity of $1.0 \times 10^{11}$ Ω/sq (ohm per square) or less when measured at 100 V (volts) or less, having a breakdown voltage of 4000 V (volts) or less, and having a charge decay of 60 seconds or less.

14. The coating of claim 13, wherein the coating has a resistivity of $1.0 \times 10^8$ Ω-m (ohm-meter) or less when measured at 40 V (volts) or less.

15. The coating of claim 13, wherein the coating is grounded to provide a bleed path for a static charge and enables dissipation of a build-up of the static charge during refueling to prevent creation of a propagating brush discharge (PBD).

16. The coating of claim 13, wherein the one or more metal components comprises one or more of aluminum components, titanium components, and corrosion-resistant steel (CRES) components.

17. The method of claim 13, wherein the coating does not induce galvanic corrosion.

18. The coating of claim 13, wherein the fuel container comprises an aircraft fuel tank.

19. The coating of claim 13, wherein the coating does not impact design for lightning direct effects protection.

20. An aircraft comprising:
a fuselage;
a wing operatively coupled to the fuselage;
a fuel tank disposed inside at least one of the fuselage and the wing, the fuel tank comprising one or more composite components comprising one of a carbon-fiber reinforced plastic (CFRP), a glass-fiber reinforced plastic (GFRP), a fiber-reinforced polyamide, an aramid-reinforced material, fiberglass, a polyester resin, a vinylester resin, and an epoxy resin, and the fuel tank further comprising one or more metal components comprising one or more of aluminum components, titanium components, and corrosion-resistant steel (CRES) components; and,
a non-chromated static dissipative coating applied directly over a surface of only the one or more composite components of the fuel tank as a topmost layer, wherein the static dissipative coating has a volume resistivity of $1.0 \times 10^9$ Ω-m (ohm-meter) or less when measured at 40 V (volts) or less, has a surface resistivity of $1.0 \times 10^{11}$ Ω/sq (ohm per square) or less when measured at 100 V (volts) or less, has a breakdown voltage of 4000 V (volts) or less, and has a charge decay of 60 seconds or less, and further wherein the static dissipative coating does not impact design for lightning direct effects protection.

\* \* \* \* \*